United States Patent [19]

Yasuda et al.

[11] 4,157,405

[45] Jun. 5, 1979

[54] COCOA BUTTER SUBSTITUTES AND THEIR PREPARATION

[75] Inventors: Nozomi Yasuda; Kimio Terada; Kazuo Itagaki; Yasuo Toyoshima; Shouji Maruzeni; Tadasu Itoh; Hideo Yokobori; Susumu Satoh, all of Tokyo, Japan

[73] Assignee: Asahi Denka Kogyo K. K., Tokyo, Japan

[21] Appl. No.: 811,851

[22] Filed: Jun. 30, 1977

[30] Foreign Application Priority Data

Jun. 30, 1976 [JP] Japan .................................. 51-77202
Jul. 19, 1976 [JP] Japan .................................. 51-85714
Mar. 11, 1977 [JP] Japan .................................. 52-26851

[51] Int. Cl.$^2$ ............................................. A23D 5/02
[52] U.S. Cl. .................................. 426/607; 260/424; 260/425
[58] Field of Search ............. 426/607; 260/398, 405.5, 260/424, 420, 425

[56] References Cited

U.S. PATENT DOCUMENTS

| | | | |
|---|---|---|---|
| 1,744,843 | 1/1930 | Taylor et al. | 260/424 |
| 1,964,875 | 7/1934 | Freiburg | 260/424 |
| 2,587,954 | 3/1952 | Babayan | 260/424 |
| 2,694,082 | 11/1954 | Palmquist | 260/424 |
| 2,702,813 | 2/1955 | Sullivan | 260/424 |
| 2,746,867 | 5/1956 | Werly | 260/424 |
| 2,975,063 | 3/1961 | Prenton et al. | 426/607 |
| 3,070,445 | 12/1962 | Sinnema | 426/607 |
| 3,226,407 | 12/1965 | Bergman | 260/424 |

*Primary Examiner*—Robert A. Yoncoskie
*Attorney, Agent, or Firm*—Blanchard, Flynn, Thiel, Boutell & Tanis

[57] ABSTRACT

A cocoa butter substitute comprises sal fat obtained by extracting the fat from the seeds of Shorea robusta and then refining the resulting product. The cocoa butter substitute has a hydroxy value of not more than 16, a solid fat index of not less than 48 at 30° C., a cooling time, at which the maximum point appears in the cooling curve, of not longer than 120 mins. and the maximum point temperature of not less than 17° C.

11 Claims, 2 Drawing Figures

COCOA BUTTER SUBSTITUTES AND THEIR PREPARATION

BACKGROUND OF INVENTION

The present invention relates to cocoa butter substitutes which are suitable for preparing chocolate with tempering. More particularly, the present invention relates to cocoa butter substitutes made of sal fat which is derived from sal seeds or the seeds of Shorea robusta.

Sal fat is one of the fats generally categorized as Borneo tallow type fats and it is extracted from the seeds of Shorea robusta, a naturally occurring tree in the tropics.

Sal fat is liable to be hydrolyzed in the tissues of sal seeds by the action of enzymes present therein. Hot and high humidity climate conditions continue for several months after the sal seeds fall off the tree in the tropics, and those ambient conditions may also accelerate the hydrolysis of fat in the tissues.

The acid value of the crude sal fat extracted from the seeds just after they fall off the tree is 3 to 4, the acid value of crude sal fat extracted from the seeds four months after they fall off the tree is 12 to 16, and the an acid value of crude sal fat extracted from the seeds ten months after they fall off the tree is usually larger than twenty. But the acid value of crude sal fat, once it has been isolated from the tissues of the seeds by extraction, does not increase very rapidly during storage. Therefore, in order to obtain crude sal fat of low acid value, or low extent of hydrolysis, the fat should be isolated from the tissues of the seeds just after the seeds fall off the tree without any delay. But it is impossible to gather most of the seeds just after they fall off the tree and also it seems to be difficult to subject the seeds to the extraction just after they have been gathered, because of lower numbers of workers and inconvenient transportation in the districts where the seeds of Shorea robusta are produced. Therefore, the level of hydrolysis of available crude sal fat varies depending on the storage conditions of the seeds.

SUMMARY OF INVENTION

The present invention relates to the technology of producing high quality cocoa butter substitutes from the sal fat regardless of the differences of the extent of hydrolysis of the crude sal fat. An object of the present invention is to provide high quality cocoa butter substitutes from the point of view of the properties suitable for producing chocolate as well as high quality of the final chocolate product.

The extents of hydrolysis of various crude sal fats are evaluated by measuring the acid values of same. In the case of deacidified sal fat, the extent of hydrolysis is evaluated by measuring its hydroxy value. There is a marked tendency that sal fats having smaller extents of hydrolysis give cocoa butter substitutes of higher quality. Unless an appropriate process is particularly adapted for refining of the crude sal fats, they can hardly be used as cocoa butter substitutes even though sal fats having smaller extents of hydrolysis are used.

Such an appropriate refining process applied to the crude sal fat is as follows. The crude sal fat is subjected to phosphoric acid treatment for degumming, and then to alkali deacidification, then washed with hot water and the water entrained in the fat is removed. The resultant fat is subsequently subjected to bleaching with activated clay, and subjected to steam distillation for deodorization.

A more detailed refining process will be described below. The crude sal fat is first subjected to the phosphoric acid treatment, in which phosphoric acid is added to the crude sal fat in an amount of 0.1 to 0.4% by weight based on the weight of the fat and they are mixed for 10 to 20 minutes at a temperature of 50°–70° C. Then the aggregated gums or mucilaginous materials are removed by press filtration or centrifugal separation. The degumming by the phosphoric acid treatment provides the refined sal fat with a better flavour. The degummed fat is subjected to alkali deacidification. In conventional alkali deacidification, the quantity of the alkali added to the crude fat is 1.1 to 1.5 times the equivalent amount necessary for neutralization of the free fatty acids existing in the crude fat and the alkali is added in the form of an aqueous solution. But, such a conventional alkali deacidification can hardly be appropriate to the refining of sal fat, because it merely gives refined sal fat of worse quality. In order to produce a refined sal fat of better quality, the quantity of the alkali to be added must be 3–10 times, more preferably 4–5 times, the equivalent amount for neutralization of the free fatty acids existing in the crude fat and the alkali is added in the form of an aqueous solution in the step of the alkali deacidification of the sal fat. Although it has not actually been elucidated why a large quantity of an alkali must be used for the alkali deacidification of the sal fat, some of the impurities which are not acidic, but have some affinities for an alkali, and are liable to become insoluble by contact with an alkali seem to be removed from the sal fat in the form of alkali foots in the step of deacidification of the sal fat. The deacidification can be performed effectively in a stepwise manner, that is, first and second deacidification steps can be used. The first deacidification step is performed by adding an alkali in an amount of 0.8–1.5 times the equivalent amount for neutralization of the free fatty acids, in the form of an aqueous solution and removing the formed foots. The second deacidification step is performed by adding aqueous alkaline solution containing alkali in an amount of 0.1 to 0.8% by weight relative to the fat and removing the formed foots. The deacidified sal fat is subjected to washing with hot water just after the alkali deacidification. The washing is performed by adding hot water in the same quantity as that of the fat to be washed and stirring it vigorously at a temperature of above 70° C., followed by removing the water by decantation or centrifugation. The residual alkali and some pigments are washed out in the hot water washing step. Such treatment makes the below mentioned bleaching with activated clay more effective and more efficient. After the hot water washing, the sal fat is bleached with activated clay. In the conventional bleaching with activated clay, the quantity of activated clay to be added to the oils and fats are 2 to 3% by weight, based on the weight of the oils and fats. But the conventional bleaching can hardly be appropriate to the refining of sal fat because it provides the refined sal fat with a dark colour. In order to produce a refined sal fat with a light colour, the quantity of activated clay to be used must be 5 to 20% by weight, based on the weight of the fat. After the bleaching step, the fat is subjected to steam distillation for effecting deodorization, which is the final step of the refining process. The steam distillation is performed by introducing steam continuously into the fat at a temperature of 220° to 270° C., more preferably 220° to 250° C., under a reduced pressure of 0.5 to 4 mmHg and removing the odoriferous materials from the fat with the steam.

Among the sal fats refined by the refining process as mentioned above, some can be used as cocoa butter substitutes, while others can hardly be used as cocoa butter substitutes from the point of view of the properties suitable for producing chocolate as well as the quality of the final chocolate product.

The relationship between the chemical and physical properties of the refined sal fat and the quality of chocolate made therefrom have been widely and intensively investigated by the inventors of the present invention. Through the investigation, it have been found that refined sal fats which have a hydroxy value of 0 to 16, preferably 0 to 13, a solid fat index at 30° C. of 48 to 60, preferably 50 to 60, a cooling time, at which the maximum point appears in the cooling curve, of 45 to 120 minutes, preferably 45 to 100 minutes and a temperature of the maximum point of 17° to 28° C., preferably 19° to 28° C. can be used as cocoa butter substitutes and they possess better quality from the point of view of the properties suitable for the manufacturing process as well as the quality of the final chocolate product. However, some of the refined sal fats which satisfy the chemical and physical properties as mentioned above are difficult to use as cocoa butter substitutes. Our further investigation reveals that the total content of hydroxy fatty acids and epoxy fatty acids in the refined sal fat influences the quality of the sal fat for use as a cocoa butter substitute. The refined sal fat which has a total content of hydroxy fatty acids and epoxy fatty acids not exceeding 1.5 weight %, preferably not exceeding 1.0 weight %, is successfully used as a cocoa butter substitute. The refined sal fat which has a total content of hydroxy and epoxy fatty acids not exceeding 1.5 weight % in the whole fatty acid composition, a hydroxy value not exceeding 16, a solid fat index at 30° C. of not less than 48, a cooling time, at which the maximum point appears in the cooling curve, of not exceeding 120 minutes and a temperature of the maximum point of not less than 17° C. in the cooling curve is successfully used as a cocoa butter substitute. In preparing chocolate by using the above-mentioned refined sal fat, the chocolate paste is solidified at a reasonable rate during the course of passing from the tempering step to the cooling step where it is passed through the cooling tunnel, and the solidified chocolate cast in a mold can be removed from the mold easily without any damage to the surface of the solidified chocolate because of its better shrinkability. The finished product of chocolate released from the mold, packed and subjected to the aging step, which is the finishing step in the production of chocolate, has a good luster, a good solidity, a good heat resistance, a sharp mouth-melting property, a good flavour, and a good resistance to fat blooming. When there is used a sal fat which has a total content of hydroxy fatty acids and epoxy fatty acids exceeding 1.5 weight % based on the total fatty acids and which does not have the desired values of hydroxy value, the solid fat index at 30° C., and the cooling time when the maximum point appears and the temperature of the maximum point in the cooling curve, many troubles occur in the manufacturing of the chocolate; the viscosity of the chocolate paste increases so rapidly in the tempering step that the paste cannot be set in the mold because of the formation of a large quantity of fat crystals, moreover the solidified chocolate is hard to remove from the mold after the cooling step even if one is able to set the paste in the mold, and the finished chocolate product has a poor luster, an unreasonable solidity, and heat resistance, a poor mouth-melting property and a poorer resistance to fat blooming. It is considered that the poor properties obtained when such a sal fat is used as a cocoa butter substitute arise from the existence of a large quantity of the hydroxy fatty acids and/or epoxy fatty acids in it.

As described above, for producing cocoa butter substitutes of better quality by using the refined sal fat, the sal fat should conclusively have a total content of hydroxy fatty acids and epoxy fatty acids not exceeding 1.5 weight %, preferably not exceeding 1.0 weight % based on the whole fatty acid composition, a hydroxy value of 0 to 16, preferably 0 to 13, a solid fat index at 30° C. of 48 to 60, preferably 50 to 60, a cooling time, at which the maximum point appears in the cooling curve, of 45 to 120 minutes, preferably 45 to 100 minutes and a temperature of the maximum point in the cooling curve of 17° to 28° C., preferably 19 to 28.

In case of the refined sal fat which does not satisfy the ranges of those values as defined hereinabove, a fractionation step should be included in the refining process such as described hereinbefore for producing the refined sal fat which satisfies those ranges. The fractionation refining as defined hereon includes winterizing fractionation, solvent fractionation, fractionation using a surface active agent as well as column chromatographic fractionation. According to these methods, monoglycerides, diglycerides, hydroxy fatty acids and epoxy fatty acids included in the crude fat can be removed. The fractionation refining is preferably performed following the step of removing water after the hot water washing step which in turn follows the deacidifying step, although it may be performed at any time in the refining process as described hereinbefore. The winterizing fractionation is performed by settling the harder fractions of the fat in a settling tank maintained at a suitable temperature. The fractionation using a surface active agent, which means a modified winterizing fractionation, is performed by crystallizing harder fractions in the fat admixed with a surface active agent. The solvent fractionation is performed by passing a mixture of fats and a solvent through cooling cylinders equipped with slowly moving internal scraper blades and then the crystallized fraction is removed by filtration. The column chromatographic fractionation is performed by passing a mixture of the fats and a non polar solvent through a column containing supports such as silica gel which can adsorb polar compounds such as hydroxy compounds and epoxy compounds, whereby the content of hydroxy compounds and epoxy compounds in the eluate can be minimized.

Figure 1:
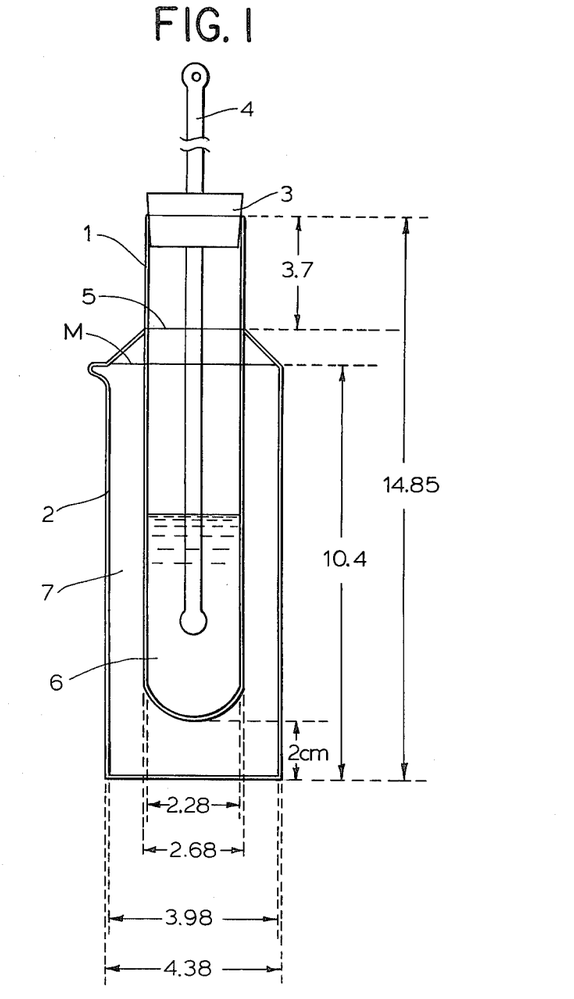
FIG. 1 is a schemative view of an apparatus for measuring the cooling curve of the fat.
Figure 2:
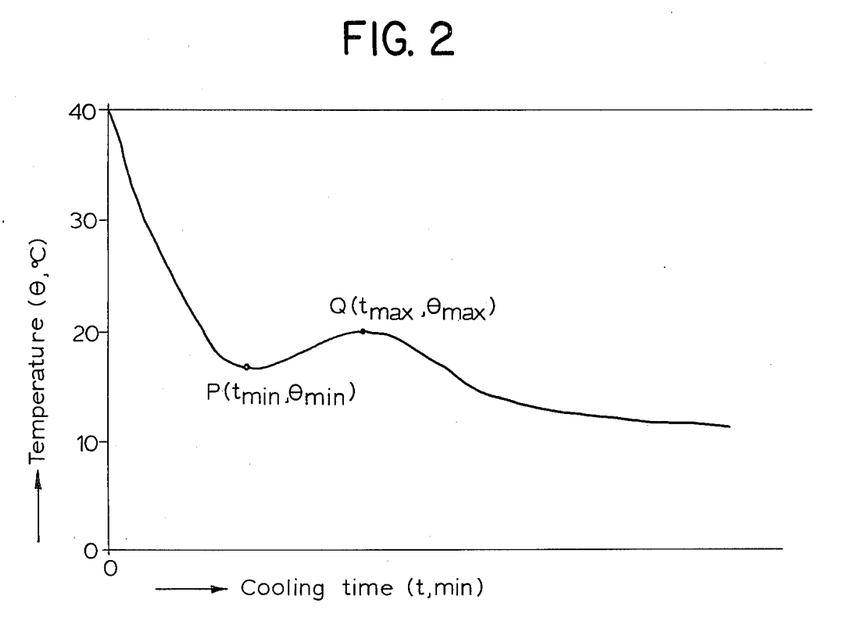
FIG. 2 is a graph showing the cooling curve of a refined sal fat.

The solid fat index which characterizes the refined sal fat of the present invention can be measured by conventional methods except for the tempering procedure, by which a sample fat in a usual tube for measurement of the solid fat index is tempered at 20° C. for 2 hours and then at 32° C. for 1 hour alternately and such alternation is repeated 6 times. The cooling curve is prepared by measurement while cooling the sample fat in the apparatus as shown in FIG. 1. The apparatus comprises an inner wall 1 and an outer wall 2, the walls being joined together at 5. The chamber 7 as defined between the walls 1 and 2 is maintained at a reduced pressure of about 10 mmHg. The lengths (unit:mm) of all parts of the apparatus are shown in FIG. 1. Twenty grams of melted fat 6 maintained at 80° C. is introduced into the inner tube 1 into which a thermometer 4 equipped with rubber stopper 3 has been inserted right in the center of the inner tube. The apparatus is set vertically in a water bath maintained at 12° C., so that the mark M of the glass tube may be positioned at the level of the water. The fat is then cooled gradually by the water bath maintained at 12° C. and measurement of temperature ($\theta$; °C.) of the fat with the passing of time (t; min) is started at the time when the temperature reaches 40° C. The outline of a cooling curve of the sal fat is shown in FIG. 2. As the sal fat tends to be supercooled, the heat of crystallization of the fat causes the temperature of the fat to rise during the cooling procedure. Therefore the cooling curve will always have a minimum point and a maximum point which are defined respectively as points P ($t_{MIN}$, $\theta_{MIN}$) and Q ($t_{MAX}$, $\theta_{MAX}$) shown in FIG.-2.

Blends of the sal fat of this invention and one or more of oils and fats such as palm oil, palm olein, a middle melting fraction of palm oil, mowrah fat (seed fat of *Madhuca longifolia*) and its fractions, shea fat (see fat of *Butyrospermum parkii*) and its fractions, kokum butter (seed fat of *Garcinia indica*) and its fractions, mango kernel (seed fat of *Mangifera indica*) and its fractions are suitable for use as cocoa butter substitutes of better quality. The above-mentioned middle melting fraction of palm oil is the fraction which is obtained by removing lower and higher melting fractions from palm oil by a method of fractionating oils and fats. The above-mentioned palm olein is the fraction which is obtained by removing a higher melting fraction from palm oil by a method of fractionating oils and fats. As above-mentioned, a cocoa butter substitute composition of better quality having improved characteristic properties of the refined sal fat can be obtained by mixing the above-mentioned oils and fats with the refined sal fat. Specifically, a cocoa butter substitute composition comprising 80–95% by weight of the refined sal fat and 5–20% by weight of refined palm oil having an iodine value of 47–54 has a very good quality and improved characteristic properties as a cocoa butter substitute. A cocoa butter substitute composition can be obtained by mixing the above-mentioned oils and fats with the refined sal fat and also by refining a mixture of crude sal fat and crude oils and fats such as crude palm oil, crude mowrah fat, crude shea fat, crude kokum fat, crude mango kernel oil, and crude illipe fat under the condition of changing crude sal fat into refined sal fat according to the present invention.

The following examples will illustrate this invention. However this invention is not limited to the following examples.

EXAMPLE 1

One thousand grams of crude sal fat (AV(acid value) 11.2, IV(iodine value) 38.0) were subjected to an acid treatment by adding 4.0 g of phosphoric acid (75% purity) and stirring it for 10 minutes at 60° C., and then it was allowed to stand still for 15 minutes. It was then filtered for removing aggregated gummy materials. 900 g of the filtrate or degummed fat were then subjected to deacidification by adding 170 g of 17 W/W % aqueous NaOH and stirring it for 10 minutes. After standing for several minutes, it was then filtered for removing the foots that were formed. Hot water was then added to the filtrate and it was stirred vigorously. After it was allowed to stand still for several minutes, the water layer was removed. Furthermore, the hot water washing was repeated two more times. The moisture entrained in the fat was removed by stirring under reduced pressure. It was then subjected to bleaching by adding activated clay in an amount of 7 weight % based on the weight of the fat and stirring at 110° C. for 5 minutes under reduced pressure. It was then filtered for removing the activated clay. The filtrate, or bleached fat, was then subjected to steam distillation at 230° C. for 3 hours for effecting deodorization. The acid value of the refined fat was 0.04.

The hydroxy value, solid fat index at 30° C., $t_{MAX}$ and $\theta_{MAX}$ of the refined sal fat were as follows.

| | |
|---|---|
| Hydroxy value | 12.8 |
| Solid fat index at 30° C. | 50.2 |
| $t_{MAX}$ | 105 minutes |
| $\theta_{MAX}$ | 19.0° C. |

Chocolate was manufactured by using the refined sal fat as a cocoa butter substitute according to the following procedure.

Table 1

| Formulation of chocolate | |
|---|---|
| Cocoa butter substitutes (refined sal fat) | 25 parts by weight |
| Powdered sugar | 50 parts by weight |
| Chocolate liquor | 5 parts by weight |
| Cocoa powder | 10 parts by weight |
| Full milk powder | 5 parts by weight |
| Skimmed milk powder | 5 parts by weight |
| Lecithin | 0.4 parts by weight |
| Vanillin | 0.02 parts by weight |

The ingredients were mixed according to the formulation of chocolate shown in the Table 1 except for a portion of the cocoa butter substitute and after the mixture was refined on a five-roller mill the additional cocoa butter substitute was added so as to satisfy the formulation. Then the mixture was subjected to conching in a rotary conche at a temperature of 50° C. for about 8 hours and then decreasing the temperature to 35° C. in the rotary conche. And after the mixture, namely, the chocolate paste, was subjected to tempering at a temperature of 27° C. for 5 minutes, it was warmed up to 38° C. in the tempering device. It was then filled into a mould and the mold was cooled by pasing it through a cooling tunnel. The solidified chocolate was then removed from the mould and was wrapped. It was then aged at a temperature of 20° C. for 2 weeks.

It was checked whether the solidifying velocity of chocolate paste was reasonable or not during the cooling step following the tempering step, and it was also checked whether the solidified chocolate was easily removed from the mould in the removing step in the manufacturing process of chocolate. The quality of the finished product was examined from the viewpoints of the state of the surface of the chocolate, the solidity and heat resistance, the mouth-melting property, and the fat bloom resistance.

The fat blooming resistance was checked by setting the chocolates in a box maintained at 20° C. for 12 hours and then at 30° C. for 12 hours alternately. The alternation was repeated until the fat bloom appeared on the surface of chocolates. As a result, the chocolate paste obtained from the above-mentioned sal fat was solidified with good solidifying velocity and the solidified chocolate was easily removed from the mould. The qualities of the finished product were excellent.

EXAMPLE 2

One thousand grams of crude sal fat (AV 15.3, IV 38.7) were subjected to the acid treatment by adding 4.0 g of phosphoric acid (75% purity) and stirring it for 10 minutes at 60° C. and then it was allowed to stand still for 15 minutes. It was then filtered for removing aggregated gummy materials. 900 g of the filtrate were then subjected to a first deacidification by adding 58 g of 17 W/W % aqueous NaOH. It was then filtered for removing the foots that were formed. 500 g of the filtrate were then subjected to a second deacidification by adding 16 g of 17 W/W % aqueous NaOH. It was then filtered for removing the foots that were formed. And it was then subjected to hot water washing, bleaching, and steam distillation under the same conditions as in Example 1. The acid value of the refined fat was 0.04.

The hydroxy value, solid fat index at 30° C., $t_{MAX}$ and $\theta_{MAX}$ of the refined sal fat were as follows.

| Hydroxy value | 15.9 |
| Solid fat index at 30° C. | 49.2 |
| $T_{MAX}$ | 110 minutes |
| $\theta_{MAX}$ | 17.6° C. |

Chocolate was manufactured by using the refined sal fat as cocoa butter substitute according to the procedure described in Example 1. The chocolate paste was solidified with a reasonable solidifying velocity and the solidified chocolate was easily removed from the mould. The qualities of the finished product were excellent.

EXAMPLE 3

Crude sal fat (AV 24.4, IV 39.5) was subjected to phosphoric acid treatment, first and second deacidification, and hot water washing. It was then subjected to column chromatographic fractionation by passing a mixture of 200 g of the sal fat and 300 g of n-hexane through a column ($\phi=3.5$ cm) containing 200 g of silica gel and then passing 3000 g of n-hexane. The n-hexane was removed from the eluted solution by distillation. 150 g of the sal fat (hydroxy value 1.5) was obtained as an eluted fraction. The fat was then subjected to bleaching by using 5 W/W % of activated clay. It was then subjected to steam distillation for deodorization. The acid value of the refined fat was 0.04.

The hydroxy value, solid fat index at 30° C., $t_{MAX}$ and $\theta_{MAX}$ of the refined sal fat were as follows:

| Hydroxy value | 1.4 |
| Solid fat index at 30° C. | 51.5 |
| $t_{MAX}$ | 80 minutes |
| $\theta_{MAX}$ | 24° C. |

Chocolate was manufactured by using the refined sal fat as cocoa butter substitute according to the procedure described in Example 1. The chocolate paste was solidified with reasonable solidifying velocity and the solidified chocolate was easily removed from the mould. The qualities of the finishing product were excellent.

EXAMPLE 4

Crude sal fat (AV 17.0, IV 39.0) was refined by the same procedure and under the same refining conditions as in Example 3. The acid value of the refined sal fat was 0.04.

The hydroxy value, solid fat index at 30° C., $t_{MAX}$ and $\theta_{MAX}$ of the refined sal fat were as follows.

| Hydroxy value | 1.0 |
| solid fat index at 30° C. | 52.0 |
| $t_{MAX}$ | 70 minutes |
| $\theta_{MAX}$ | 26.0° C. |

Chocolate was manufactured by using the refined sal fat as cocoa butter substitute according to the procedure described in Example 1. The chocolate paste was solidified with reasonable solidifying velocity and the solidified chocolate was easily removed from the mould. The qualities of the finished product were very excellent.

EXAMPLE 5

Crude sal fat (AV 24.4, IV 39.5) was subjected to column chromatographic fractionation by passing a mixture of 200 g of crude sal fat and 200 g of chloroform through a column ($\phi=3.5$ cm) containing 200 g of Florisil (Trademark) and then passing 1500 g of chloroform. The chloroform was removed from the eluted solution by distillation. 156 g of the sal fat (hydroxy value 4.8) was obtained as an eluted fraction. The fat was then subjected to deacidification, bleaching, and deodorization by the same procedure and under the same conditions as in Example 1. The acid value of the refined sal fat was 0.04.

The hydroxy value, solid fat index at 30° C., $t_{MAX}$ and $\theta_{MAX}$ of the refined sal fat were as follows.

| Hydroxy value | 4.8 |
| Solid fat index at 30° C. | 51.3 |
| $t_{MAX}$ | 85 minutes |
| $\theta_{MAX}$ | 22° C. |

Chocolate was manufactured by using the refined sal fat as cocoa butter substitute according to the procedure described in Example 1. The chocolate paste was solidified with reasonable solidifying velocity and the solidified chocolate was easily removed from the mould. The qualities of the finished product were excellent.

EXAMPLE 6

Crude sal fat (AV 17.0, IV 39.0) was subjected to phosphoric acid treatment, deacidification, and hot water washing by the same procedure and under the same conditions as in Example 2. 400 g of the sal fat was mixed with 2000 g of n-hexane and the mixture was then cooled to −5° C. and held at that temperature for 30 minutes. 275 g of a cake fat (hydroxy value 8.1) were obtained by filtration of the mixture. The cake fat was then subjected to bleaching and deodorization by the same procedure as in Example 2. The acid value of the refined sal fat was 0.04.

The hydroxy value, solid fat index at 30° C., $t_{MAX}$ and $\theta_{MAX}$ of the refined sal fat were as follows.

| | |
|---|---|
| Hydroxy value | 8.0 |
| Solid fat index at 30° C. | 52.0 |
| $t_{MAX}$ | 90 minutes |
| $\theta_{MAX}$ | 20.0° C. |

Chocolate was manufactured by using the refined sal fat as cocoa butter substitute according to the procedure described in Example 1. The chocolate paste was solidified with reasonable solidifying velocity and the solidified chocolate was easily removed from the mould. The qualities of the finished product were excellent.

EXAMPLE 7

Crude sal fat (AV 24.4, IV 39.5) was subjected to phosphoric acid treatment, deacidification, and hot water washing by the same procedure and under the same conditions as in Example 2. 400 g of the sal fat were mixed with 2400 g of acetone and the mixture was then cooled to 5° C. and held at that temperature for 30 minutes. 280 g of a cake fat (hydroxy value 8.2) were obtained by filtration of the mixture. The cake fat was then subjected to bleaching and deodorization by the same procedure as in Example 3. The acid value of the refined sal fat was 0.05.

The hydroxy value, solid fat index at 30° C., $t_{MAX}$ and $\theta_{MAX}$ of the refined sal fat were as follows.

| | |
|---|---|
| Hydroxy value | 8.0 |
| Solid fat index at 30° C. | 50.7 |
| $t_{MAX}$ | 95 minutes |
| $\theta_{MAX}$ | 18° C. |

Chocolate was manufactured by using the refined sal fat as cocoa butter substitute according to the procedure described in Example 1. The chocolate paste was solidified with reasonable solidifying velocity and the solidified chocolate was easily removed from the mould. The qualities of the finished product were excellent.

COMPARATIVE EXAMPLE 1

One thousand grams crude sal fat (AV 11.2, IV 38.0) was subjected to deacidification by adding 61 g of 17 W/W % aqueous NaOH and stirring it for 10 minutes. After standing for several minutes, it was then filtered for removing the foots that were formed. It was then subjected to bleaching by adding the activated clay in an amount of 3 weight %, based on the weight of the fat, and stirring at 110° C. for 5 minutes under reduced pressure. It was then filtered for removing the activated clay. The filtrate was then subjected to steam distillation at 250° C. for 2 hours for the deodorization. The acid value of the refined fat was 0.04.

The hydroxy value, solid fat index at 30° C., $t_{MAX}$ and $\theta_{MAX}$ of the refined sal fat were as follows.

| | |
|---|---|
| Hydroxy value | 12.7 |
| Solid fat index at 30° C. | 48.0 |
| $t_{MAX}$ | 130 minutes |
| $\theta_{MAX}$ | 16.5° C. |

Chocolate was manufactured by using the refined sal fat as cocoa butter substitute according to the procedure described hereinbefore. The chocolate paste was not solidified with reasonable solidifying velocity and the solidified chocolate was not easily removed from the mould. The qualities of the finished product were undesirable.

COMPARATIVE EXAMPLE 2

Crude sal fat (AV 17.0, IV 39.0) was refined by the same procedure as in Example 2. The acid value of the refined fat was 0.04.

The hydroxy value, solid fat index at 30° C., $t_{MAX}$ and $\theta_{MAX}$ of the refined sal fat were as follows.

| | |
|---|---|
| Hydroxy value | 17.6 |
| solid fat index at 30° C. | 49.5 |
| $t_{MAX}$ | 145 minutes |
| $\theta_{MAX}$ | 16.2° C. |

Chocolate was manufactured by using the refined sal fat as cocoa butter substitute according to the procedure described hereinbefore. The chocolate paste was not solidified with reasonable solidifying velocity and the solidified chocolate was not easily removed from the mould. The qualities of the finished product were undesirable.

COMPARATIVE EXAMPLE 3

Crude sal fat (AV 24.4, IV 39.5) was refined by the same procedure as in Example 2. The acid value of the refined fat was 0.04.

The hydroxy value, solid fat index at 30° C., $t_{MAX}$ and $\theta_{MAX}$ of the refined sal fat were as follows.

| | |
|---|---|
| Hydroxy value | 25.8 |
| Solid fat index at 30° C. | 45.0 |
| $t_{MAX}$, $\theta_{MAX}$ | maximum point did not appear. |

Chocolate was manufactured by using the refined sal fat as cocoa butter substitute according to the procedure described hereinbefore. The chocolate paste was not solidifed with reasonable solidifying velocity and the solidified chocolate was not easily removed from the mould. The qualities of the finished product were undesirable.

EXAMPLE 8

One thounsand grams of crude sal fat (AV 5.3, IV 40.1) having 0.1 weight % of hydroxy and epoxy fatty acids based on the total fatty acids composition were subjected to the acid treatment by adding 2.0 g of phosphoric acid (75% purity) and stirring it for 10 minutes at 60° C. It was then filtered for removing aggregated gummy materials. 900 g of the filtrate or degummed fat were then subjected to deacidification by adding 80 g of 20 W/W % aqueous NaOH and stirring for 10 minutes. After it was allowed to stand still for several minutes, it was then filtered for removing the foots that were formed. Hot water was then added to the filtrate and was stirred vigorously. After standing for several minutes, the water layer was removed. Furthermore, the hot water washing was repeated two more times. The moisture entrained in the fat was removed by stirring under reduced pressure. The fat was then subjected to bleaching by adding activated clay in an amount of 15 weight % based on the weight of the fat and stirring at 110° C. for 5 minutes under reduced pressure. It was then filtered for removing the activated clay. The filtrate was then subjected to steam distillation at 250° C. for one hour for effecting deodorization. The acid value of refined sal fat was 0.04.

The hydroxy and epoxy fatty acids content, hydroxy value, solid fat index at 30° C., $t_{MAX}$ and $\theta_{MAX}$ of the refined sal fat were as follows.

| Hydroxy & epoxy fatty acids content | 0.1 % |
|---|---|
| Hydroxy value | 5.9 |
| Solid fat index at 30° C. | 60.5 |
| $t_{MAX}$ | 50 minutes |
| $\theta_{MAX}$ | 22.5° C. |

Chocolate was manufactured by using the refined sal fat as a cocoa butter substitute according to the following procedure.

Table 2

| Formulation of chocolate | |
|---|---|
| Cocoa butter substitute (refined sal fat) | 10.0 (parts by weight) |
| Powdered sugar | 45.0 (parts by weight) |
| Cocoa butter | 10.0 (parts by weight) |
| Chocolate liquor | 20.0 (parts by weight) |
| Full milk powder | 15.0 (parts by weight) |
| Lecithin | 0.30 (parts by weight) |
| Vanillin | 0.02 (parts by weight) |

The ingredients were mixed according to the formulation of chocolate shown in the Table 2 except for a portion of the cocoa butter substitute and cocoa butter and after the mixture was refined on a five-roller mill, the remaining cocoa butter substitute and cocoa butter was added so as to satisfy the formulation. Then the mixture was subjected to conching in a rotary conche at a temperature of 50° C. for about 10 hours and then decreasing the temperature to 35° C. in the rotary conche. And after the mixture, namely, the chocolate paste, was subjected to tempering at a temperature of 27° C. for 5 minutes, it was warmed up to 38° C. in the tempering device. It was then filled into a mould and was cooled by passing it through a cooling tunnel. The solidified chocolate was then removed from the mould and was wrapped. It was then aged at a temperature of 20° C. for 2 weeks.

It was checked whether the solidifying velocity of chocolate paste was reasonable or not in the course of the cooling step following the tempering step, and it was also checked whether the solidified chocolate was easily removed from the mould in the removing step in the manufacturing process of chocolate. The quality of the finished product was examined from the viewpoints of the surface state, the solidity and heat resistance, the mouth-melting property, and the fat bloom resistance. The results are shown in Table 3.

The fat blooming resistance was checked by setting the chocolates in a box maintained at 20° C. for 12 hours and then at 30° C. for 12 hours alternately. The alternation was repeated until the fat bloom appeared on the surfaces of the chocolates. The result is shown in Table 4.

EXAMPLE 9

Crude sal fat (AV 14.0, IV 39.0) having 1.1 weight % of hydroxy and epoxy fatty acids based on the total fatty acid composition was refined by the same procedure as in Example 8.

The hydroxy and epoxy fatty acids content, hydroxy value, solid fat index at 30° C., $t_{MAX}$ and $\theta_{MAX}$ of the refined sal fat were as follows.

| Hydroxy and epoxy fatty acids content | 1.1 % |
|---|---|
| Hydroxy value | 14.2 |
| Solid fat index at 30° C. | 51.3 |
| $t_{MAX}$ | 60 minutes |
| $\theta_{MAX}$ | 20.5° C. |

Chocolate was manufactured by using the refined sal fat as cocoa butter substitute according to the procedure described in Example 8. The result is shown in Tables 3 and 4.

EXAMPLE 10

Four hundred grams of crude sal fat (AV 5.6, IV 38.0) having 5.1 weight % of hydroxy and epoxy fatty acids based on the total fatty acid composition were mixed with 1600 g of n-hexane. The mixture was cooled to 15° C. and kept at that temperature for 60 minutes with stirring. 370 g of filtrate was obtained by filtration of the mixture. The filtrate fat was refined by the same procedure as in Example 8. The acid value of the refined fat was 0.04.

The hydroxy and epoxy fatty acids content, hydroxy value, solid fat index at 30° C., $t_{MAX}$ and $\theta_{MAX}$ of the refined fat were as follows.

| Hydroxy and epoxy fatty acids content | 0.9 |
|---|---|
| Hydroxy value | 5.0 |
| Solid fat index at 30° C. | 58.4 |
| $t_{MAX}$ | 55 minutes |
| $\theta_{MAX}$ | 20.5° C. |

Chocolate was manufactured by using the refined fat as cocoa butter substitute according to the procedure described in Example 8. The results are shown in Tables 3 and 4.

EXAMPLE 11

Crude sal fat (AV 6.9, IV 39.1) having 3.2% of hydroxy and epoxy fatty acids based on the total fatty acids composition was subjected to the acid treatment, deacidification, and bleaching by the same procedure as in Example 8. 1000 g of the bleached fat were kept at 38° C. for 48 hours. Thereafter, 200 g of aqueous solution containing sodium lauryl sulfate (0.5 W/W %) and magnesium sulfate (2.0 W/W %) was added to the fat. It was then stirred vigorously and then crystallized fat was removed by centrifugation. It was then subjected to hot water washing. After removing the entrained water, it was subjected to the steam distillation at 250° C. for one hour. The acid value of the refined fat was 0.04.

The hydroxy and epoxy fatty acids content, hydroxy value, solid fat index at 30° C., $t_{MAX}$ and $\theta_{MAX}$ of the refined fat were as follows.

| Hydroxy and epoxy fatty acids content | 1.0 % |
|---|---|
| Hydroxy value | 7.3 |
| Solid fat index at 30° C. | 52.3 |
| $t_{MAX}$ | 75 minutes |
| $\theta_{MAX}$ | 19.0° C. |

Chocolate was manufactured by using the refined fat as cocoa butter substitute according to the procedure described in Example 8. The results are shown in Tables 3 and 4.

COMPARATIVE EXAMPLE 4

Crude sal fat (AV 5.6, IV 38.0) having 5.1 weight % of hydroxy and epoxy fatty acids based on the total fatty acids composition was refined by the same procedure as in Example 8. The acid value of the refined sal fat was 0.04.

The hydroxy and epoxy fatty acids content, hydroxy value, solid fat index at 30° C., $t_{MAX}$ and $\theta_{MAX}$ of the refined fat were as follows.

| Hydroxy and epoxy fatty acids content | 5.1% |
|---|---|
| Hydroxy value | 29.8 |
| Solid fat index at 30° C. | 56.9 |
| $t_{MAX}$ | 80 minutes |
| $\theta_{MAX}$ | 20.5° C. |

Chocolate was manufactured by using the refined sal fat as cocoa butter substitute according to the procedure described hereinbefore. The chocolate paste was not solidified with reasonable solidifying velocity and the solidified chocolate was not easily removed from the mould. The qualities of the finished product were undesirable.

Table-3

The result of the chocolate preparing test the qualities of the prepared chocolate

| Sample (refined sal fat) | The result of the chocolate preparing test | | The qualities of the prepared chocolate | |
|---|---|---|---|---|
| | Solidifying velocity | Mould release | Mouth-melting property | Flavour |
| of example 8 | very good | very good | good | good |
| of example 9 | good | good | good | good |
| of example 10 | good | good | good | good |
| of example 11 | good | good | good | good |
| of comparative example 4 | good | bad | bad | bad |

Table-4

The result of fat blooming test (one cycle: 20° C. for 12 hours/30° C. for 12 hours)

| Sample | 0 | 5 | 10 | 15 | 20 | 25 | 30 | 35 | 50 | 75 | 80 | 85 | 90 |
|---|---|---|---|---|---|---|---|---|---|---|---|---|---|
| Chocolate of example 8 | − | − | − | − | − | − | − | − | − | ± | + | ++ | ++ |
| of example 9 | − | − | − | − | − | − | − | − | ± | ± | + | ++ | ++ |
| of example 10 | − | − | − | − | − | − | − | − | ± | ± | + | ++ | ++ |
| of example 11 | − | − | − | − | − | − | − | ± | ± | + | + | ++ | ++ |
| of comparative example 4 | − | − | ± | ± | + | ++ | ++ | ++ | ++ | ++ | ++ | ++ | ++ |

−State of the surface having luster
±State of the surface having slight fat bloom
+State of the surface having apparent fat bloom
++State of the surface having larger amount of fat bloom

EXAMPLE 12

10 Kg of crude sal fat (AV 8.5, IV 39.2) was refined by the same procedure as in Example 1. The acid value of the refined sal fat was 0.04.

The hydroxy value, solid fat index at 30° C., $t_{MAX}$ and $\theta_{MAX}$ of the refined sal fat were as follows.

| Hydroxy value | 9.2 |
|---|---|
| Solid fat index at 30° C. | 51.6 |
| $t_{MAX}$ | 95 minutes |
| $\theta_{MAX}$ | 19.8° C. |

The refined sal fat was blended with refined palm oil (AV 0.04, IV 53.0) of which the proportions were 0 (Sample No. 1), 3 (Sample No. 2), 5 (Sample No. 3), 10 (Sample No. 4) 20 (Sample No. 5) and 30 (Sample No. 6) weight % based on the weight of blended fats. The solid fat index and the parameters of the cooling curve of the refined sal fat and blended fats are shown in Table 5.

Chocolates were manufactured by using the refined sal fat and the blended fat as cocoa butter substitute according to the procedure described in Example 8. The results of the manufacturing process and the qualities of the finished products are shown in Table 6. The fat blooming resistance of these chocolates was checked by the procedure described hereinbefore, and the results are shown in Table 7. The qualities of the chocolates of Sample No. 3, 4 and 5 were very excellent as shown in Table 6 and Table 7.

Table-5

Solid fat index and parameters of cooling curve of blended fat of sal fat and palm oil

| Sample No. | Cocoa butter substitute | | Solid fat index | | | | Cooling curve | |
|---|---|---|---|---|---|---|---|---|
| | Sal fat weight % | Palm oil weight % | 20° C. | 30° C. | 35° C. | 40° C. | ($t_{MIN}$, $\theta_{MIN}$) | ($t_{MAX}$, $\theta_{MAX}$) |
| 1 | 100 | 0 | 58.2 | 51.6 | 7.0 | 0 | (60, 16.5) | (95, 19.8) |
| 2 | 97 | 3 | 57.3 | 49.8 | 6.4 | 0 | (58, 16.8) | (92, 19.6) |

Table-5-continued

Solid fat index and parameters of cooling curve of blended fat of sal fat and palm oil

| Sample No. | Cocoa butter substitute Sal fat weight % | Cocoa butter substitute Palm oil weight % | Solid fat index 20° C. | Solid fat index 30° C. | Solid fat index 35° C. | Solid fat index 40° C. | Cooling curve ($t_{MIN}, \theta_{MIN}$) | Cooling curve ($t_{MAX}, \theta_{MAX}$) |
|---|---|---|---|---|---|---|---|---|
| 3 | 95 | 5  | 57.2 | 45.7 | 5.8 | 0 | (52, 17.0) | (80, 19.5) |
| 4 | 90 | 10 | 56.4 | 40.9 | 4.0 | 0 | (50, 16.5) | (75, 19.5) |
| 5 | 80 | 20 | 52.6 | 38.3 | 3.1 | 0 | (55, 16.9) | (85, 19.5) |
| 6 | 70 | 30 | 49.1 | 30.6 | 2.2 | 0 | (80, 17.8) | (110, 18.1) |

Table-6

Manufacturing test and qualities of chocolates

| Sample No. | Manufacturing test Solidifying velocity | Manufacturing test Mould release | Qualities of chocolates Mouth-melting property | Qualities of chocolates Flavour |
|---|---|---|---|---|
| 1 | reasonable | good | good | good |
| 2 | reasonable | good | good | good |
| 3 | very reasonable | good | good | good |
| 4 | very reasonable | very good | good | very good |
| 5 | reasonable | good | good | good |
| 6 | un-reasonable | bad | good | bad |

Table-7

Fat blooming test
one cycle = 20° C. for 12 hours/30° C. for 12 hours

| Cycle No / Sample No. | 0 | 5 | 10 | 15 | 20 | 25 | 30 | 35 | 50 | 75 | 80 | 85 | 90 |
|---|---|---|---|---|---|---|---|---|---|---|---|---|---|
| 1 | − | − | − | − | − | − | − | − | ± | + | ++ | ++ | ++ |
| 2 | − | − | − | − | − | − | − | − | ± | ± | + | + | ++ |
| 3 | − | − | − | − | − | − | − | − | − | − | − | ± | ± |
| 4 | − | − | − | − | − | − | − | − | − | − | − | ± | ± |
| 5 | − | − | − | − | − | − | − | − | − | − | ± | ± | ± |
| 6 | − | − | − | − | − | ± | + | + | ++ | ++ | ++ | ++ | ++ |

Symbol
− State of the surface having luster
± State of the surface having slight fat bloom
+ State of the surface having apparent fat bloom
++ State of the surface having larger amount of fat bloom

EXAMPLE 13

10 Kg of crude sal fat (AV 14.0, IV 38.5) were refined by the same procedure as in Example 1. The acid value of the refined sal fat was 0.04.

The hydroxy value, solid fat index at 30° C., $t_{MAX}$ and $\theta_{MAX}$ of the refined sal fat were as follows.

| | |
|---|---|
| Hydroxy value | 14.8 |
| Solid fat index at 30° C. | 50.3 |
| $t_{MAX}$ | 110 minutes |
| $\theta_{MAX}$ | 17.6° C. |

The refined sal fat was blended with refined palm oil (AV 0.04, IV 48.9) of which the proportions were 0 (Sample No. 1), 3 (Sample No. 2), 5 (Sample No. 3), 10 (Sample No. 4), 15 (Sample No. 5), and 25 (Sample No. 6) weight % based on the weight of blended fats. The solid fat index and the parameters of the cooling curve of the refined sal fat and blended fats are shown in Table 8.

Chocolate were manufactured by using the refined sal fat and the blended fat as cocoa butter substitute according to the procedure described in Example 8. The results of the manufacturing process and the qualities of the product are shown in Table 9. The fat blooming resistance of these chocolates was checked by the procedure described hereinbefore, and the results are shown in Table 10. The qualities of the chocolates of Sample No. 3, 4, and 5 were very excellent as shown in Table 9 and Table 10.

Table-8

Solid fat index and parameters of cooling curve of blended fat of sal fat and palm oil

| Sample No. | Cocoa butter substitute Sal fat weight % | Cocoa butter substitute Palm oil weight % | Solid fat index 20° C. | Solid fat index 30° C. | Solid fat index 35° C. | Solid fat index 40° C. | Cooling curve ($t_{MIN}, \theta_{MIN}$) | Cooling curve ($t_{MAX}, \theta_{MAX}$) |
|---|---|---|---|---|---|---|---|---|
| 1 | 100 | 0  | 59.3 | 50.3 | 6.5 | 0 | (80, 15.2) | (110, 17.6) |
| 2 | 97  | 3  | 58.9 | 49.0 | 6.0 | 0 | (75, 15.5) | (105, 18.0) |
| 3 | 95  | 5  | 57.2 | 45.2 | 5.5 | 0 | (70, 15.7) | (100, 18.2) |
| 4 | 90  | 10 | 55.7 | 40.3 | 4.2 | 0 | (70, 16.0) | (95, 18.2) |
| 5 | 85  | 15 | 52.6 | 38.0 | 3.2 | 0 | (75, 15.9) | (105, 17.5) |

Table-8-continued

Solid fat index and parameters of cooling curve of blended fat of sal fat and palm oil

| Sample No. | Cocoa butter substitute Sal fat weight % | Palm oil weight % | Solid fat index 20° C. | 30° C. | 35° C. | 40° C. | Cooling curve ($t_{MIN}, \theta_{MIN}$) | ($t_{MAX}, \theta_{MAX}$) |
|---|---|---|---|---|---|---|---|---|
| 6 | 75 | 25 | 48.3 | 30.1 | 2.0 | 0 | (—)* | (—)* |

*Maximum point did not appear.

Table-9

| | Manufacturing test and qualities of chocolates | | | |
|---|---|---|---|---|
| | Manufacturing test | | Qualities of chocolates | |
| Sample No. | Solidifying velocity | Mould release | mouth-melting property | flavour |
| 1 | reasonable | good | good | good |
| 2 | reasonable | good | good | good |
| 3 | reasonable | good | good | good |
| 4 | reasonable | good | good | good |
| 5 | reasonable | good | good | good |
| 6 | unreasonable | bad | good | bad |

Table-10

| Cycle No. Sample No. | 0 | 5 | 10 | 15 | 20 | 25 | 30 | 35 | 37 | 40 | 50 | 75 | 80 | 85 | 90 |
|---|---|---|---|---|---|---|---|---|---|---|---|---|---|---|---|
| 1 | — | — | — | — | — | — | — | — | — | — | ± | ± | + | + | ++ | ++ |
| 2 | — | — | — | — | — | — | — | — | — | — | — | ± | ± | + | + | ++ |
| 3 | — | — | — | — | — | — | — | — | — | — | — | — | — | ± | ± |
| 4 | — | — | — | — | — | — | — | — | — | — | — | — | — | ± | ± |
| 5 | — | — | — | — | — | — | — | — | — | — | — | — | ± | ± | ± |
| 6 | — | — | — | — | — | ± | ± | ± | + | + | ++ | ++ | ++ | ++ | ++ |

Symbol
— State of the surface having luster
± State of the surface having slight fat bloom
+ State of the surface having apparent fat bloom
++ State of the surface having larger amount of fat bloom

What we claim is:

1. A cocoa butter substitute comprising a refined fat obtained from the seeds of Shorea robusta, said refined fat having a hydroxy value of up to 16, a solid fat index at 30° C. of from 48 to 60, a cooling time at which the maximum point appears in the cooling curve in the range of from 45 to 120 minutes and the temperature of said maximum point of the cooling curve is from 17° to 28° C., wherein the cooling curve is obtained by cooling 20 grams of the refined fat from a temperature of 40° C. using the apparatus of FIG. 1 immersed in a water bath maintained at 12° C.

2. A cocoa butter substitute according to claim 1, wherein said refined fat has a hydroxy value of up to 13, a solid fat index at 30° C. of from 50 to 60, a cooling time at which the maximum point appears in the cooling curve in the range of 45 to 100 minutes and the temperature of said maximum point of the cooling curve is from 19° to 28° C.

3. A cocoa butter substitute according to claim 1, wherein said refined fat has a total content of hydroxy fatty acids and epoxy fatty acids of not more than 1.5% by weight.

4. A cocoa butter substitute according to claim 2, wherein said refined fat has a total content of hydroxy fatty acids and epoxy fatty acids of not more than 1.0% by weight.

5. A process for producing a cocoa butter substitute which comprises treating a crude sal fat obtained from the seeds of Shorea robusta with 0.1 to 0.4% by weight of phosphoric acid based on the weight of said fat for 10–20 minutes at a temperature of 50°–70° C., then removing aggregated gums and mucilaginous materials from said fat, then adding to said fat aqueous alkali solution containing alkali in an amount of from 3 to 10 times the equivalent amount of the alkali required for neutralizing free fatty acids contained in said fat and treating said fat with said alkali for a time sufficient to deacidify said fat and form foots, then removing the foots that are formed by the alkali treatment, then washing said fat with hot water at a temperature above about 70° C. for a time sufficient to remove impurities comprising residual alkali and pigments, then drying said fat, then treating said fat with about 5 to 20% by weight of activated clay based on the weight of said fat to decolorize said fat, then removing the activated clay and materials adsorbed thereon from said fat, then deodorizing said fat by steam distillation at a temperature of 220° to 270° C. for a time sufficient to remove odoriferous materials and thereby obtaining a refined sal fat having a hydroxy value of up to 16, a solid fat index at 30° C. of 48 to 60, a cooling time at which a maximum point appears in the cooling curve in the range of 45 to 120 minutes and the temperature of said maximum point of 17° to 28° C., wherein the cooling curve is obtained by cooling 20 grams of the refined fat from a temperature of 40° C. using the apparatus of FIG. 1 immersed in a water bath at 12° C.

6. A process for producing a cocoa butter substitute as claimed in claim 5, including the additional step of removing impurities consisting mainly of monoglycerides, diglycerides, hydroxy fatty acids and epoxy fatty acids present in the crude sal fat by a step selected from the group consisting of winterizing fractionation, solvent fractionation, fractionation using a surface active agent and column chromatographic fractionation.

7. A process for producing a cocoa butter substitute as claimed in claim 5, including the additional step of removing impurities consisting mainly of monoglycerides, diglycerides, hydroxy fatty acids and epoxy fatty acids present in the crude sal fat, after the fat has been washed with hot water and then dried, by a step selected from the group consisting of winterizing fractionation, solvent fractionation, fractionation using a surface active agent and column chromatographic fractionation.

8. A process for producing a cocoa butter substitute which comprises treating a crude sal fat obtained from the seeds of Shorea robusta with 0.1 to 0.4% by weight of phosphoric acid based on the weight of said fat for 10-20 minutes at a temperature of 50°-70° C., then removing aggregated gums and mucilaginous materials from said fat, then performing a stepwise alkali deacidification wherein in a first alkali treatment adding to said fat aqueous alkali solution containing alkali in an amount of from 0.8 to 1.5 times the equivalent amount of the alkali required for neutralizing free fatty acids in the crude fat and treating said fat with said alkali for a time sufficient to form foots, then removing the foots that are formed by the first alkali treatment, then in a second alkali treatment adding to said fat aqueous alkali solution containing alkali in an amount of from 0.1 to 0.8% by weight relative to the fat and treating said fat with said alkali for a time sufficient to form foots, then removing the foots that are formed by the second alkali treatment, then washing said fat with hot water at a temperature above about 70° C. for a time sufficient to remove impurities comprising residual alkali and pigments, then drying said fat, then treating said fat with about 5 to 20% by weight of activated clay based on the weight of said fat to decolorize said fat, then removing the activated clay and materials adsorbed thereon from the fat, then deodorizing the fat by steam distillation at a temperature of 220° to 270° C. for a time sufficient to remove odoriferous materials and thereby obtaining a refined sal fat having a hydroxy value of up to 16, a solid fat index at 30° C. of 48 to 60, a cooling time at which a maximum point appears in the cooling curve in the range of 45 to 120 minutes and the temperature of said maximum point of the cooling curve is from 17° to 28° C., wherein the cooling curve is obtained by cooling 20 grams of the refined fat from a temperature of 40° C. using the apparatus of FIG. 1 immersed in a water bath maintained at 12° C.

9. A process for producing a cocoa butter substitute as claimed in claim 8, including the additional step of removing impurities consisting mainly of monoglycerides, diglycerides, hydroxy fatty acids and epoxy fatty acids present in the crude sal fat by a step selected from the group consisting of winterizing fractionation, solvent fractionation, fractionation using a surface active agent and column chromatographic fractionation.

10. A process for producing a cocoa butter substitute as claimed in claim 8, including the step of removing impurities consisting mainly of monoglycerides, diglycerides, hydroxy fatty acids and epoxy fatty acids present in the crude fat, after the fat has been washed with hot water and then dried, by a step selected from the group consisting of winterizing fractionation, solvent fractionation, fractionation using a surface active agent and column chromatographic fractionation.

11. A cocoa butter substitute composition consisting essentially of 80 to 95% by weight of refined sal fat as claimed in claim 1 and 5 to 20% by weight of refined palm oil having an iodine value of 47 to 54.

* * * * *